US012252904B2

(12) United States Patent
Enger et al.

(10) Patent No.: US 12,252,904 B2
(45) Date of Patent: Mar. 18, 2025

(54) PANEL DOOR LOCKOUT

(71) Applicant: Brady Worldwide, Inc., Milwaukee, WI (US)

(72) Inventors: Andrew N. Enger, Muskego, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 155 days.

(21) Appl. No.: 17/986,646

(22) Filed: Nov. 14, 2022

(65) Prior Publication Data

US 2023/0077093 A1 Mar. 9, 2023

Related U.S. Application Data

(63) Continuation of application No. 16/892,041, filed on Jun. 3, 2020, now Pat. No. 11,525,284.

(51) Int. Cl.
*E05B 55/00* (2006.01)
*E05B 19/00* (2006.01)
(Continued)

(52) U.S. Cl.
CPC ........ *E05B 55/005* (2013.01); *E05B 19/0035* (2013.01); *E05B 63/20* (2013.01); *E05C 19/188* (2013.01); *E05Y 2900/132* (2013.01)

(58) Field of Classification Search
CPC .... E05B 55/00; E05B 55/005; E05B 19/0035; E05B 63/20; E05B 67/383;
(Continued)

(56) References Cited

U.S. PATENT DOCUMENTS 3,059,952 A 10/1962 Wittman et al.
3,903,719 A 9/1975 Katz
(Continued)

FOREIGN PATENT DOCUMENTS

BR 202018003573 U2 9/2019
GB 2177058 A 1/1987

OTHER PUBLICATIONS

European Patent Office, Extended Search Report, Application No. 21176009.5, Nov. 3, 2021, 7 pages.
(Continued)

*Primary Examiner* — Suzanne L Barrett
(74) *Attorney, Agent, or Firm* — Quarles & Brady LLP

(57) ABSTRACT

A lockout device is able to secure a door on a panel. The lockout device includes a housing and a flexible line. The housing has a first mounting portion adapted for securement to one side of the panel and the flexible line has on one end thereof a second mounting portion adapted for securement to another side of the panel from the first mounting portion. The housing further supports at least one line engagement element, and the flexible line extends through at least a portion of the housing including the at least one line engagement element for selective engagement therewith. In use, the mounting portions may be affixed or attached to opposing sides or edges of the panel, the flexible line drawn taut, and the line engagement element(s) of the housing used to engage the flexible line to hold it in position with respect to the housing.

14 Claims, 6 Drawing Sheets

(51) Int. Cl.
*E05B 63/20* (2006.01)
*E05C 19/18* (2006.01)

(58) Field of Classification Search
CPC ............. E05B 65/0888; E05B 65/0894; E05C 19/188; E05C 19/003; E05C 19/186; E05Y 2900/132; Y10T 70/5155; Y10T 70/411; Y10T 70/435; Y10T 70/483; Y10T 292/23; Y10T 292/34; Y10T 292/243; Y10T 292/228; Y10T 292/37; Y10T 292/283; Y10T 292/20; Y10T 292/394; Y10T 292/397; Y10T 292/67
USPC .............................................................. 70/91
See application file for complete search history.

(56) References Cited

U.S. PATENT DOCUMENTS

| | | | |
|---|---|---|---|
| 4,970,882 | A | 11/1990 | Arrendondo |
| 4,974,889 | A | 12/1990 | North |
| 5,369,970 | A | 12/1994 | Voiculescu et al. |
| 5,419,165 | A | 5/1995 | Perkins |
| 5,447,346 | A | 9/1995 | Virzi |
| 5,452,929 | A | 9/1995 | Anderson |
| 5,466,023 | A | 11/1995 | Williamson |
| 5,517,835 | A | 5/1996 | Smith |
| 5,573,289 | A | 11/1996 | Littlefair |
| 5,582,046 | A | 12/1996 | Baumwoll et al. |
| 5,620,215 | A | 4/1997 | Janeway |
| 5,716,084 | A | 2/1998 | Sanford, Jr. et al. |
| 5,794,464 | A * | 8/1998 | Yeager ................ E05B 73/0029 242/421 |
| 5,823,020 | A | 10/1998 | Benda |
| 5,842,359 | A | 12/1998 | Longueira |
| 6,112,560 | A | 9/2000 | Mabee |
| 6,705,652 | B2 | 3/2004 | Engel |
| 7,325,281 | B1 | 2/2008 | Willems |
| 7,581,420 | B2 | 9/2009 | Manthe et al. |
| 7,681,421 | B2 | 3/2010 | Cannon |
| 7,870,767 | B2 | 1/2011 | Brojanac et al. |
| 9,105,168 | B2 | 8/2015 | Shute et al. |
| 9,184,573 | B1 | 11/2015 | Jonas et al. |
| 9,243,431 | B1 | 1/2016 | DeLeon |
| 9,284,760 | B2 | 3/2016 | Canaday et al. |
| 11,525,284 | B2 * | 12/2022 | Enger ................... E05C 19/186 |
| 2008/0155781 | A1 | 7/2008 | Buis |
| 2009/0217713 | A1 | 9/2009 | Loughlin et al. |
| 2018/0106071 | A1 | 4/2018 | Ivy |

OTHER PUBLICATIONS

European Patent Office, Extended European Search Report, Application No. 23214506.0, Mar. 20, 2024, 7 pages.

* cited by examiner

PANEL DOOR LOCKOUT

CROSS-REFERENCE TO RELATED APPLICATION

This application is a continuation application of U.S. Non-Provisional patent application Ser. No. 16/892,041 filed Jun. 3, 2020, the contents of which application is hereby incorporated by reference for all purposes as if set forth in its entirety herein.

STATEMENT OF FEDERALLY SPONSORED RESEARCH OR DEVELOPMENT

Not applicable.

BACKGROUND

This application relates to a lockout device for panel doors such as, for example, doors on breaker boxes that may have various circuit breakers contained therein.

Electrical breaker boxes can contain multiple circuit breaker switches inside of them. Such boxes typically have a cover or front panel that is opened to provide access to number of circuit breakers. In addition to automatically tripping to protect an electrical circuit from being damaged by excess current from an overloaded or shorted circuit, these circuit breakers may be manually turned off, for example, if electrical work is being performed or equipment is being serviced.

To limit access and prevent entry into to such breaker boxes, devices exist that can lock access to the panel door such as can be found, for example, in U.S. Pat. Nos. 7,681,421; 9,184,573; 9,243,431; and 9,284,760. Often, a rigid bar or strap are secured in front of the door of the box to prevent the door from being opened until the device is removed. Such access-limiting devices might be used, for example, to secure the door to prevent initial entry into the box and/or to secure the box while work is performed so that the breakers that have been shut off cannot be turned back on while work is ongoing.

SUMMARY

However, the aforementioned panel door locks are not always well suited for lockout type applications and/or are not easy to install, remove, transport, and store.

Many of the aforementioned locking devices that are known in the art are not designed to accommodate the locks of multiple users, nor are readily adapted to be modified to accept multiple locks. While a single lock may be better than none at all, when multiple workers are doing work at the same time such single lock designs may not be sufficient to follow group lockout practices in which each worker has their own separate lock for attachment. This can avoid, for example, the possibility of a first worker turning one of the breaker switches back on while a second worker, unbeknownst to the first worker, continues to need that switch off.

Still further, many of the locking devices that exist are multi-component and limited in the manner in which they can be used. Such multi-component devices may be awkward to install, as two components or more components may need to be held in place while an additional point needs to be manipulated or engaged to secure them together. Moreover, when such devices are multi-component with separable components, one of the components may be easy to misplace or separated from the others, rendering the device useless.

Beyond these potential use issues, because such locking devices are designed to span a length of more than a foot in many cases, these devices, especially when rigid, can be large and cumbersome to carry and/or store. Likewise, if rigid, a particular locking device may only be suitable for use with a narrow range of panel widths and limited in its range of application.

Disclosed herein is an improved lockout device for a door on a panel. This device incorporates an openable/closeable housing and a flexible line extending therethrough. Both the housing and one end of the flexible line can be mountable to the front panel at edges or fasteners so the device traverses a door on the panel and potentially restricts that door from being opened when the lockout device is secured. With the housing opened, the line can be drawn taut (potentially temporarily secured in place with the housing still opened, for example, by the engagement of cleated cams with the line). Upon closing the housing, the line can be secured in position using one or more line engagement elements such as clamping teeth that are engaged with the flexible line by the act of closure of the housing. One or more locks, such as padlocks, can be attached to the closed housing to retain the housing in the closed and line-secured position as part of a group-compatible lockout process, and only after all locks are removed may the housing be opened and the flexible line released from its position such that the lockout device can be removed from the panel.

This design provides many potential advantages. For one, various widths of panels may be readily accommodated so long as the flexible line is long enough. Likewise, the use of the flexible line permits the device to be smaller and more compact once removed to accommodate easy storage, especially compared to a fully rigid device. Moreover, the line can be provided with features on its axial ends and interact with the housing in such a way that the housing and line cannot be separated from one another—meaning that neither of the components is likely to be lost. Still further, by virtue of this overall design, multiple openings can be readily provided so that the housing can be secured in the closed position as part of a group lockout process (in comparison to some known designs in which only a single lock may be used to secure the device in the secured position, or there is not a sufficient way to ensure the lockout is maintained, even if multiple locks were used).

According to one aspect, a lockout device is disclosed for a door on a panel. The lockout device includes a housing and a flexible line. The housing has a first mounting portion adapted for securement to one side of the panel and the flexible line has on one end thereof a second mounting portion adapted for securement to another side of the panel from the first mounting portion. The housing further supports at least one line engagement element, and the flexible line extends through at least a portion of the housing including the line engagement element(s) for selective engagement therewith.

In some forms, when the first mounting portion and the second mounting portion are secured to opposite sides of the panel, the flexible line may be drawn taut across the door and may be secured with the line engagement element(s) so as to inhibit removal of the lockout device from the panel and prevent an opening of the door.

In some forms, the housing may have a pair of movable sections (movable in that at least one of the sections is movable with respect to the other section), at least one of the pair of movable sections may support line engagement element(s), and the pair of movable sections may be movable with respect to one another between an open position in which the line engagement element(s) is/are accessible and a closed position in which the pair of movable sections are lockable together such that the line engagement element(s) is/are not accessible. In such forms, one of the pair of movable sections may include a tab with lock openings and the other of the pair of movable section may include a slot through which the tab may pass. When the pair of movable sections are brought together to the closed position and the tab is received through the slot, a lock may be placed in one of the lock openings to prevent the separation of the pair of movable sections from one another and to restrict access to the line engagement element(s). In such forms, the pair of movable sections may be hinged together on one side thereof and may be moveable between the open position and the closed position in a clamshell fashion. In such case, each of the pair of movable sections may have clamping teeth as at least a part of the line engagement element(s) and, when the pair of movable sections are closed together, the clamping teeth can engage the flexible line to grip the flexible line at the clamping teeth. It is contemplated that the clamping teeth may be molded as part of the pair of movable sections.

In some forms, the line engagement element(s) may include a pair of cleated cams between which the flexible line is receivable. In such forms, a guide for the line may connect the pair of cleated cams on a top end thereof may be used to provide a restricted space apart from (but adjacent to) the pair of cleated cams for the disengagement of the flexible line from the pair of cleated cams while retaining the flexible line in the housing.

In some forms, the line engagement element(s) may include clamping teeth.

In some forms, the line engagement elements may include clamping teeth between which teeth the flexible line extends and may further include a pair of cleated cams between which the flexible line is positionable. The pair of cleated cams may accommodate a temporary or initial positioning of the flexible line during installation of the lockout device onto a box while the housing is still opened and, when the pair of movable sections are brought together, the clamping teeth may further engage and secure the flexible line.

In some forms, the line engagement element(s) may include or further include housing openings on the housing that close around the flexible line as the housing is closed.

In some forms, the first mounting portion and the second mounting portion may include brackets that are adapted to be wrapped around an edge of the panel. In some forms, additionally or alternatively to the brackets on one or both portions, the first mounting portion and the second mounting portion include many openings or notches which are adapted to be secured via a corresponding fastener to the panel. Thus, it is contemplated that in some forms, the first mounting portion and the second mounting portion may each include brackets that are adapted to be wrapped around an edge of the panel and may further include openings or notches which are adapted to be secured via a fastener to the panel. Those openings and notches could be separate from the brackets or potentially made a part of them depending on the geometry and design.

In some forms, the flexible line may have a stop at the end of the flexible line not having the second mounting portion. The housing may include one or more line openings, guides, or loops through which the flexible line extends and the stop and the second mounting portion can be sized relative to line openings, guides, or loops to inhibit the passage of the stop and the second mounting portion past the line openings, guides, or loops. Thus, once they are assembled together, this can effectively help to keep the flexible line and the housing together with one another so that the flexible line cannot be separated or lost from the housing and so that the lockout device parts all remain together.

Thus, in some forms, the housing and the flexible line may not be completely separable from one another once assembled together.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figures 1, 2:
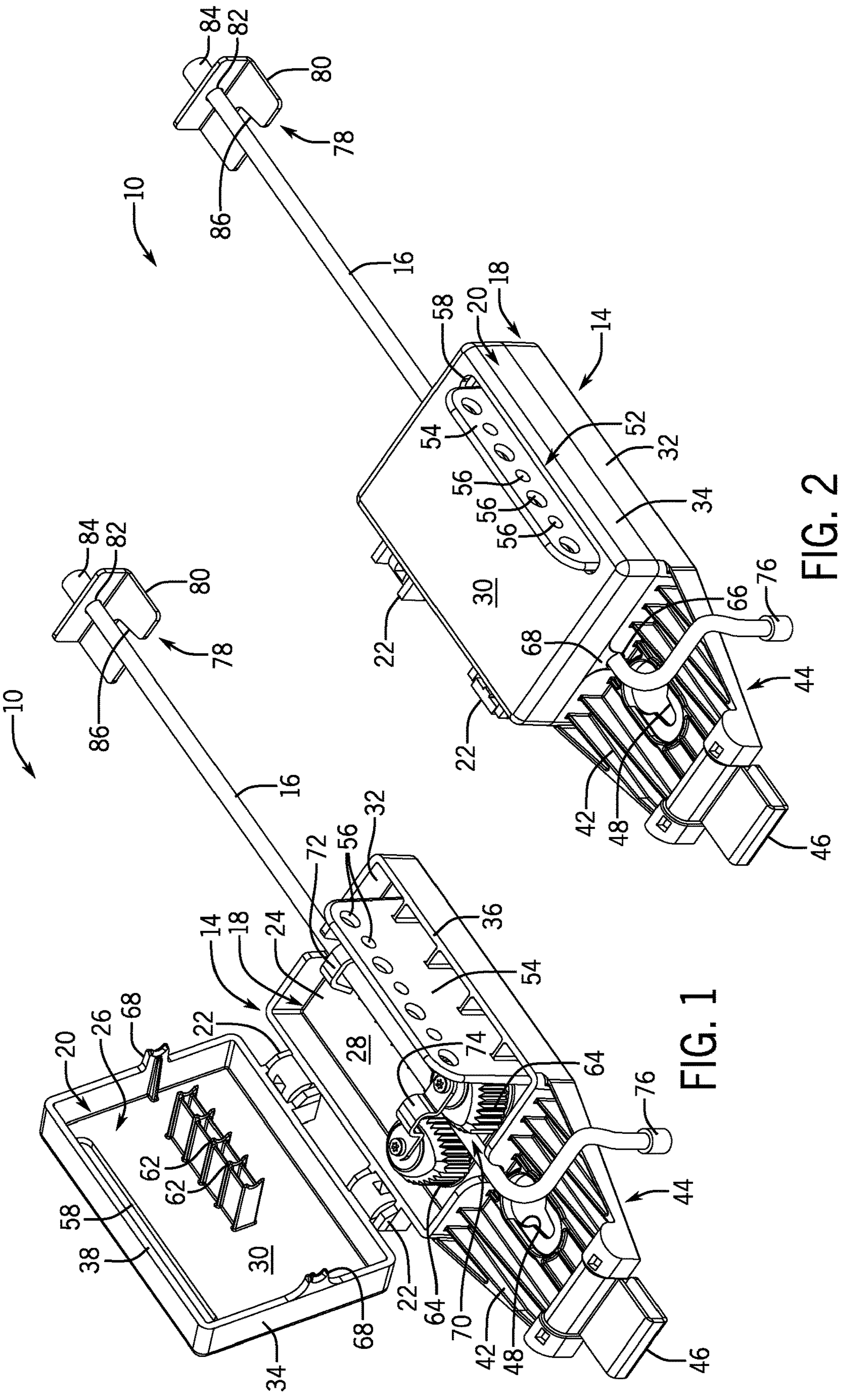
FIG. 1 is a front, left, bottom view of a panel door lockout device in an opened position.
FIG. 2 is a front, left, bottom view of the lockout device of FIG. 1 in a closed position.

Referring to FIGS. 1 and 2, a lockout device 10 is illustrated in an opened and a closed position, respectively. This lockout device 10 is designed for attachment to the front panel of a box with a door such as a breaker box 12 as is shown, for example, in FIGS. 5, 6A, 6B, 7A, and 7B.

For the sake of the discussion that follows, it should be appreciated that directionality being used in describing the features are made with reference to the figures are relative only and to help improve understanding. When referencing a forward direction, this refers to a front face of the device 10 and box 12 as viewed in FIG. 5 (i.e., features that are towards the viewer). From this it logically follows that the top and bottom sides are towards the top and bottom sides of the page respectively, with the left and right directions also being those directions on the page. A rearward or backwards feature or direction is referring to a feature or direction that would be away from the viewer in this view and more deeply into the page.

With reference being made to FIGS. 1 through 4 generally, the lockout device 10 includes two main parts. The first of these parts is a housing 14 and the second of these parts is a flexible line 16. The housing 14 may be made for example from a relatively rigid component, such as a plastic or metal, while the flexible line 16 may be made for example from a fibrous string or cable or even potentially a polymeric or woven cable that is flexible about its axial length (as well as being sufficiently compliant or deformable locally so that the line 16 is capable of being engaged by the later-described line engagement elements for positional securement). It is further desirable that the line 16 not be easily cut or easily damaged under the moderately low amounts of tension it may come under during use or under the engagement with the line engagement elements as will be described in greater detail below.

Looking first at the housing 14, the housing 14 has a pair of movable sections 18 and 20 that are connected to one another in a clamshell or book-like fashion at hinges 22. For the sake of clarity, the sections 18 and 20 are "movable" in that at least one of the sections is movable relative to the other. As illustrated, the hinges 22 are pin-less, having arcuate projections that extend from one of the movable sections 18 and 20 into a receiving loop on the other of the movable section 18 and 20. In the form shown, one of each of these projections and loops are provided on each one of the movable sections 18 and 20 and are arranged so that they can only be potentially separated from one another in one or some of the angular positions of the opened positions.

As can be best seen in FIG. 1, each of the movable sections 18 and 20 provides a generally concave and hollow volume 24, 26 defined by a base wall 28, 30 with a set of peripheral side walls 32, 34, respectively. When closed together, the edges 36, 38 of the peripheral side walls 32, 34 meet to create a largely-enclosed cavity 40 from the two volumes 32, 34 as best seen in the cross-sectional view of FIG. 4.

There are various other features found in or supported by the movable sections 18 and 20. These features generally relate to one of [1] mounting the housing 14 on the front panel of the box 12 (using an edge thereof or a fastener received therein), [2] locking the movable sections 18 and 20 in the closed position, and/or [3] securing the position of the flexible line 16 in the housing 14 when the movable sections 18 and 20 of the housing 14 are closed during use.

Figure 3:
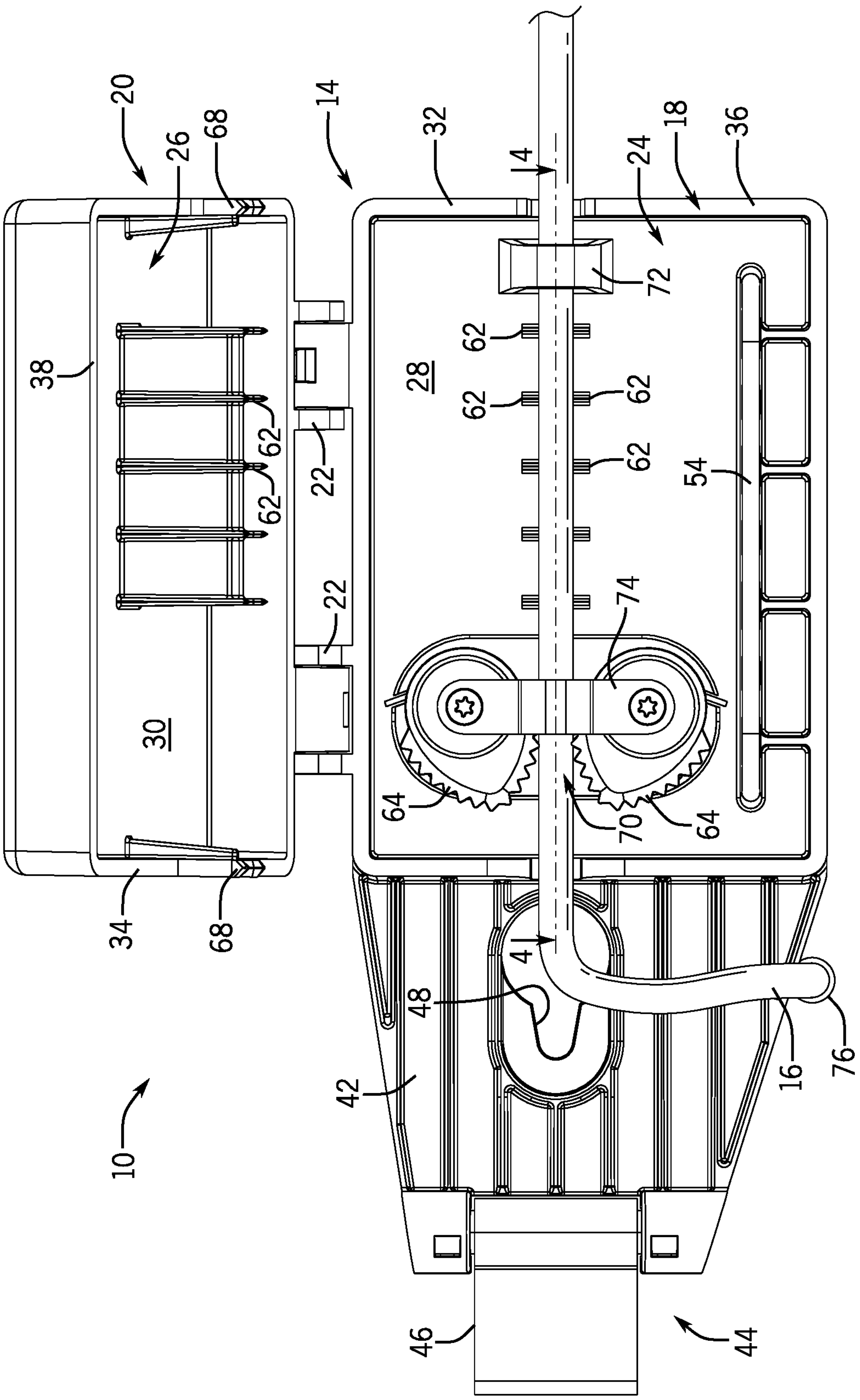
FIG. 3 is a front plan view of the lockout device of FIG. 1.

Looking first at the mounting features of the housing 14, as illustrated in FIGS. 1 through 3, the leftmost side of the housing 14 has a flange 42 projecting therefrom that provides a first mounting portion 44. This first mounting portion 44 is on the one of the movable sections that is to be received closest to the front face of the panel (as illustrated, this is movable section 18). In this way, it can be ensured that the other one of the movable sections (as illustrated, movable section 20) can be opened and closed relative to movable section that is directly mounted and may be immobile relative to the box 12 at that point. Put differently, if the front or outermost movable section 20 was mounted instead of the rear movable section 18, then it may not be possible to open and close the housing 14 after the housing 14 is mounted, so generally speaking the section closest to the front panel shall be the section that supports the first mounting portion 44.

In the particular form illustrated, the first mounting portion 44 includes structure for two different modes of mounting.

Figure 5:
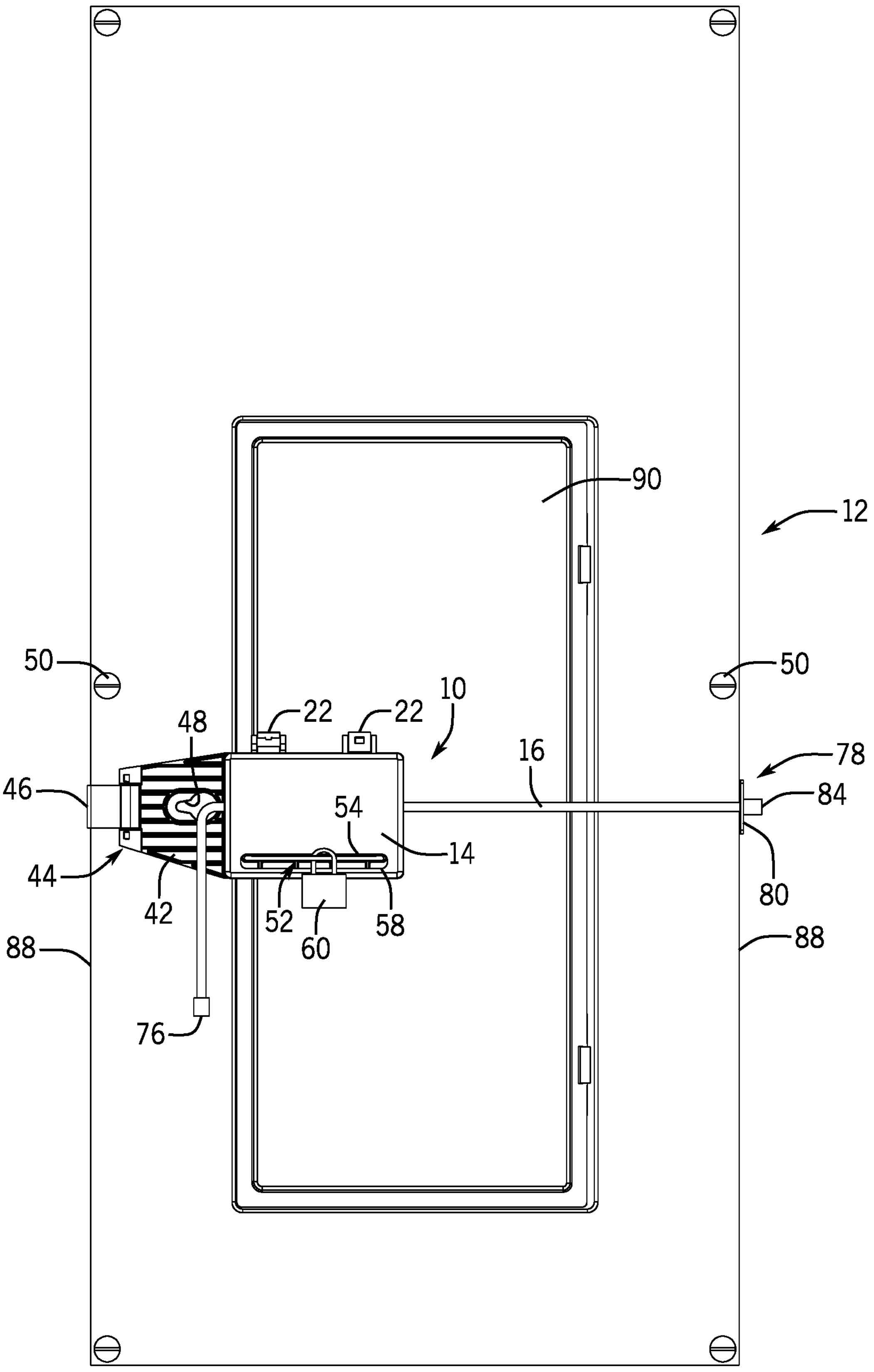
FIG. 5 is an example front view of the lockout device of FIGS. 1-4 secured on the front face of a breaker box in which the brackets of the lockout device are used to engage the edges of the front panel.
Figure 6A:
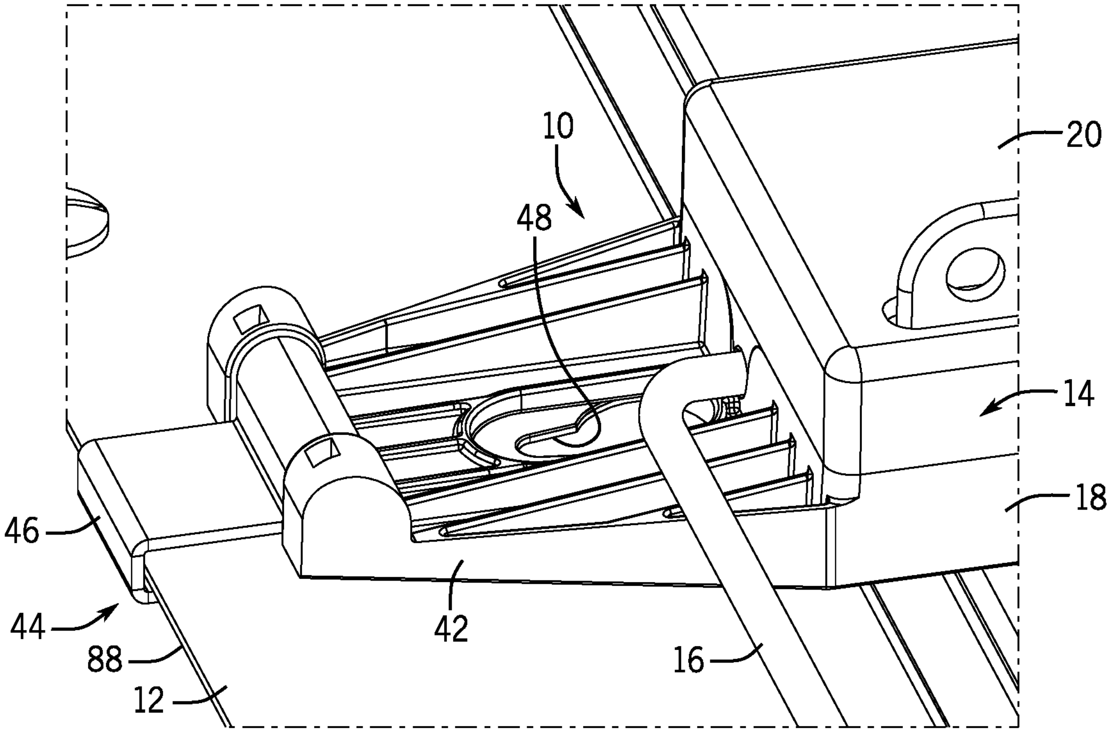
FIGS. 6A and 6B are detailed perspective views of the brackets at the ends of the lockout device attached around the peripheral edge of the front panel of the breaker box from FIG. 5.
Figure 7A:
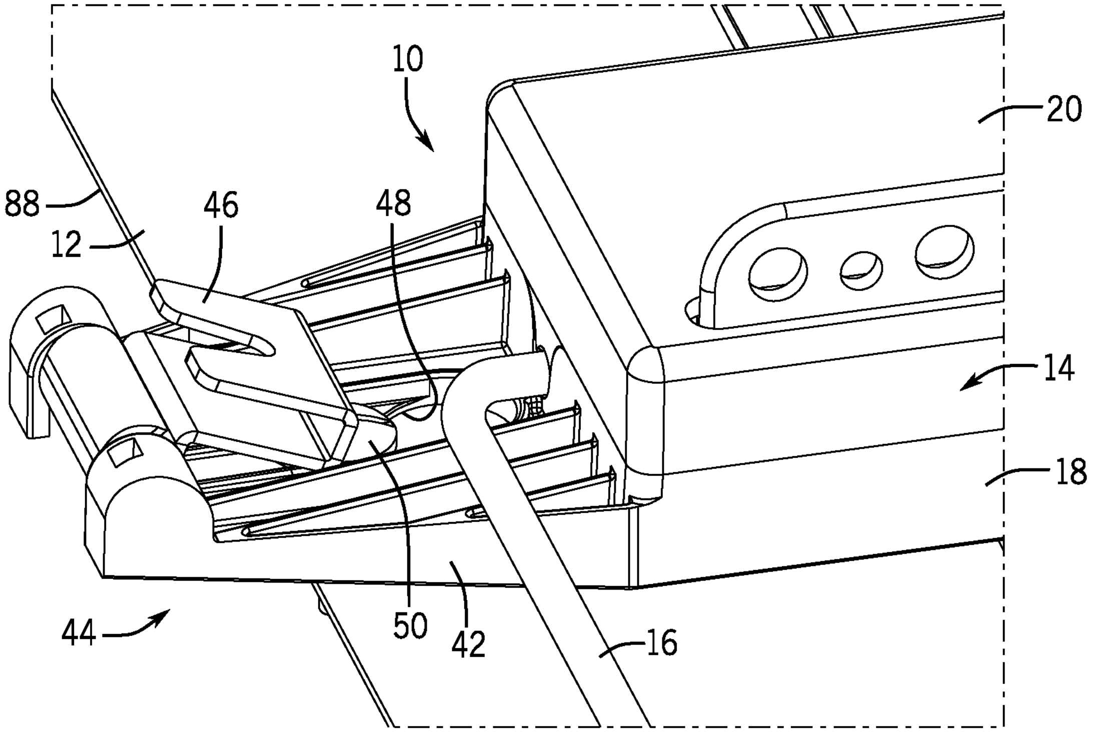
FIGS. 7A and 7B are detailed perspective views of an alternative mounting arrangement in which, instead of using the brackets as in FIGS. 5, 6A, and 6B, openings or keyways are used to secure the ends of the lockout devices to screw on the front face of the panel.

The first mode of mounting is a U-shaped bracket 46 which may be wrapped around an edge 88 of panel during mounting of the lockout device 10, for example, as is illustrated in FIGS. 5 and 6A. This bracket 46 may be hinged or movable relative to the housing 14 and/or the flange 42, as is illustrated in FIG. 7A, so that the bracket 46 may not project laterally outward to the left when other mounting means (described more below) are employed. The view of FIG. 7A is perhaps the best view to show the U-shaped portion of the bracket 46, which is at least partially obstructed in the other views, and how it can hinge or pivot.

The first mounting portion 44 also offers a second mode of mounting which involves a key slot shaped mounting opening 48 for reception of a fastener or screw 50 therethrough in which the fastener or screw 50 can be secured to the panel of the box 12 as is shown, for example, in FIG. 7A. It is contemplated that the fastener or screw 50 may already be a part of the box 12 and its assembly or may be added thereto for mounting purposes specifically. The use of the key slot shape can permit the head of a screw or fastener 50 to pass through the larger part of the opening 48 and then the housing 14 moved (e.g., rightward as illustrated) such that the stem of the fastener 50 enters the slender portion of the opening 48 from which the mounting portion 44 cannot be lifted from the panel surface due to the engagement of the area surrounding the slot with the larger head of the fastener or screw 50.

Of course, these are but two possible mounting modes and it is contemplated that there may be one or more different mounting structures in addition to or in alternative to those expressly described and illustrated as being part of the housing 14. Likewise, both of these modes need not be employed in any particular embodiment, although some mode of mounting does need to be available. Moreover, while a flange 42 is described as supporting and providing the first mounting portion 44 for the housing 14, it is contemplated that the first mounting portion 44 may be provided in a different manner as part of the housing 14 (for example, it could be directly part of one of the side walls 32).

Turning now to the locking features, the housing 14 also includes a locking mechanism 52 that can, when the movable sections 18 and 20 are in the closed position of FIG. 2, be used to secure the movable sections 18 and 20 together. As illustrated, the locking mechanism 52 includes, as a first part thereof, a tab 54 projecting forwardly from the base wall 28 of the movable section 18 in which the tab 54 has a set of lock openings 56 at a distal end thereof. The locking mechanism 52 further includes a slot 58 in the base wall 30 of the movable section 20. When the housing 14 is in the opened position of FIG. 1, the tab 54 and the slot 58 are separated from one another and, upon bringing the movable sections 18 and 20 together to the closed position shown in FIG. 2, the tab 54 is received into and extends through the slot 58. Accordingly, in this closed position, the distal-most portion of the tab 54 from the base wall 28 extends outside of the cavity 40, such that the lock openings 56 are available and accessible outside the cavity 40 as shown in FIG. 2. In this closed position, a shackle of a padlock 60 (see FIG. 5), for example, can be run through one of these openings 56, to prevent the closed housing 14 from being re-opened until the padlock 60 is removed as the base wall 30 of the movable section 20 is blocked from moving past the opening(s) 56 when the opening(s) 56 are occupied by the shackle(s) of the padlock(s) 60. As this is a lockout device adapted for group use, it is noted that there are multiple openings 56 such that more than one user may attach their individual lock at a time. Then, not until all locks are removed from the openings 56—when maintenance is fully completed and all workers are done with their tasks—may the housing 14 be opened and the breaker switches again accessed to turn them back on.

It will be appreciated that while a tab and slot configuration is shown as a locking mechanism 52 in the illustrated embodiment, that other types of locking mechanisms may be employed including any of the various locking mechanisms that are known in LOTO (lock out/tag out) type devices. For example, each of the movable sections may have a plurality of openings on a projecting tab or wall and, when the sections are brought together, the sets of openings on each of the sections may be aligned with one another to permit securement in that closed position by one or more locks.

Now turning to the line securing features, the housing 14 has and supports various structures or line engagement elements that can be used to secure or grip the flexible line 16 that runs right to left through the housing 14 as best shown in FIG. 3. These line engagement elements include, in the form illustrated, three different line engagement elements including clamping teeth 62 on the inside of the cavity 40, a pair of cleated cams 64, and undersized housing openings 66.

Figure 4:
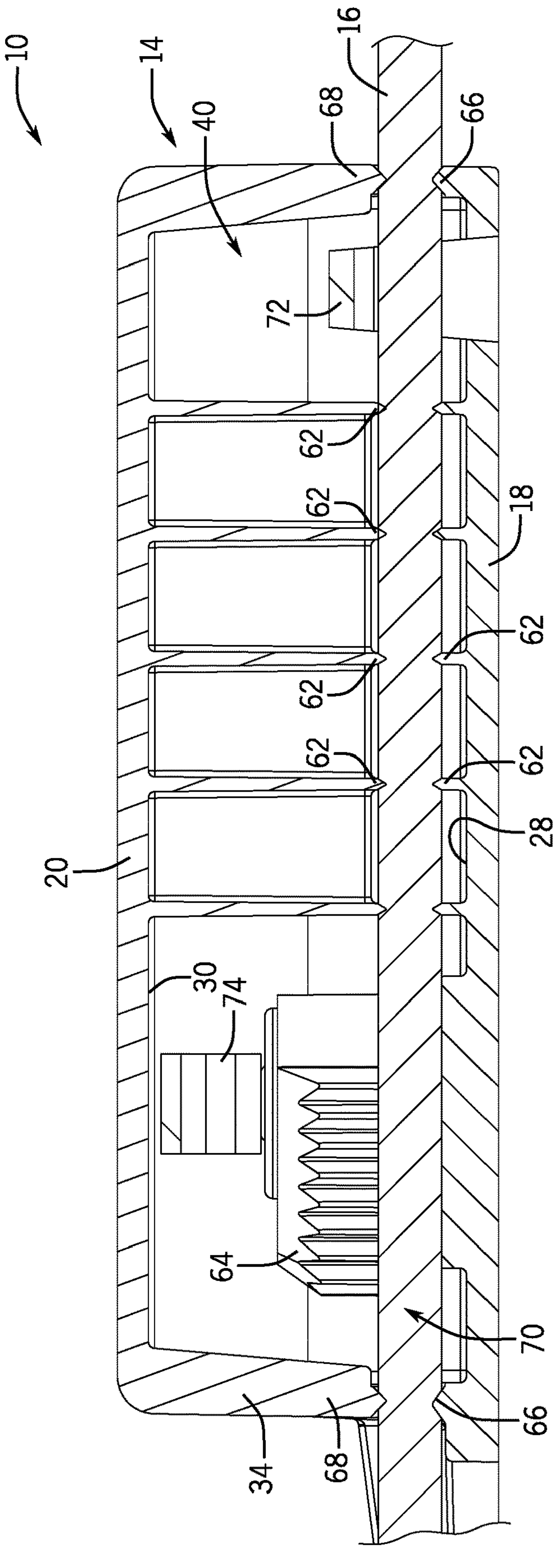
FIG. 4 is a cross sectional view of the lockout device taken through line 4-4 of FIG. 3 showing the engagement of the closed housing around the line to engage and pinch the teeth into the line.

First, a set of clamping teeth 62 are molded into or supported by the base walls 28 and 30. These teeth 62 are linearly positioned along the path of the flexible line 16 between the housing openings 66 through the cavity 40 of the housing 14 such that, when the housing 14 is closed in clamshell fashion, the clamping teeth 62 close towards one another and engage the flexible line 16 on opposing sides to engage and slightly dig into the flexible line 16 as best shown in FIG. 4. When the housing 14 is opened, the clamping teeth 62 are separated, such that the flexible line 16 is free of the clamping teeth 62 and the line 16 can slide over the bottom set of the teeth 62 on section 18 without being held by them.

Similar to how the clamping teeth 62 operate, the undersized housing openings 66 can likewise pinch the flexible line 16 at the locations where the flexible line 16 enters and exits the housing 14. These undersized housing openings 66 are formed at the left and right sides of the peripheral side walls 32, 34 (for example, as half-circle shapes which, as illustrated, includes one section as part of a recess and one section on a projection 68 extending out from the edge 38 of the wall 34), so that part of the openings 66 are formed each on the edge 36, 38 of each opposing side walls 32, 34. When the two movable sections 18 and 20 are closed together, these half sections join to form the openings 66 and close around the flexible line 16 to grip the line 16 at these points. As with the clamping teeth 62, the openings 66 can taper to a point over their axial length and this taper can be seen, for example, in FIG. 4 to engage or bite into the flexible line 16.

In addition to the aforementioned clamping teeth 62 and housing openings 66, there are also a set of cleated cams 64 within the housing 14 as can be best seen in FIGS. 1 and 3. These cleated cams 64 are rotatably mounted to the base wall 28 of the section 18 (with respective rotational axes that are generally perpendicular to the base wall 28 of the section 18). A passageway 70 is provided between the cleated cams 64 that can receive the flexible line 16. In the particular form shown, both of these cleated cams 64 are teardrop shaped with the tips of the cleated cams 64 facing leftward in the orientations illustrated. In this way, when a flexible line 16 is inserted into the passageway 70 between the cleated cams 64, the rightward movement of the flexible line 16 will contact the teeth/cleats and cause the tips of the cleated cams 64 to rotate inwards towards one another until the cams 64 are unable to rotate further towards one another, thereby pinching the flexible line 16 to prevent its further rightward movement absolutely. In such a case to free the flexible line 16, the flexible line 16 may be lifted outwardly or forwardly to remove the line 16 from the passageway 70. These cleated cams 64 can be helpful in that they can provide a temporary restraint on the flexible line 16 while the housing 14 is still open and before the clamping teeth 62 and the housing openings 66 have engaged the line 16 by virtue of the closure of the housing 14.

Notably, when the housing 14 or its movable sections 18 and 20 are closed and secured, these line engagement elements are not accessible and the flexible line 16 cannot be disengaged from the housing 14. With the use of the locking mechanism 52 and with such line engagement elements only being able to be disengaged when the housing 14 is opened, this means that, if one or more locks (e.g., padlock 60) are used to secure the housing 14 shut, then these line engagement elements cannot be disengaged without first removing the lock or locks. Moreover, in at least the illustrated embodiment, at least some of these line engagement elements (i.e., the clamping teeth 62 and the housing openings 66) are engaged by the very act of closing the housing 14 and then disengaged upon the opening of the housing 14 and so the two actions and functions are linked together.

It is to be appreciated that while three line engagement elements are shown in the illustrated embodiment, that, in other forms, not all of these line engagement elements need be present or they may be used in other combinations with one another or separately. For example, one or more of the line engagement elements may be omitted or other types of line engagement elements used in combination with those specifically described. Still further, line engagement elements other than those depicted here may be used to similar effect, assuming that their use can be restricted by the closure of a housing.

Looking more generally at the flexible line 16 beyond its interaction with the line engagement elements, it is again noted that the line 16 runs from right to left through the housing 14. As can be seen best in FIG. 1, there are a pair of line openings, guides, or loops 72 and 74 on section 18 that help to direct or guide the flexible line 16 through the housing 14 and prevent the flexible line 16 from separating from the housing 14 or from deviating from its path therethough. As illustrated, the guides 72 and 74 are found on opposite sides of the clamping teeth 62, with the guide 72 on the rightmost side of the housing 14 arching up from the basewall 28 and potentially being formed integrally therewith by molding or the like. The leftmost guide 74 is attached at the ends of the axes of the cleated cams 64. This leftmost guide 74 can help with retaining the flexible line 16 near the cleated cams 64, while still permitting the line 16 to be lifted away or forward to manually disengage the line from the cleated cams 64, when desired, without fully separating the two from one another.

Still yet, in conjunction with these guides 72 and 74, features on the axial ends on the flexible line 16 can prevent the axial separation of the line 16 from the housing 14 by moving the line 16 too far in one direction.

On the leftmost end of the line 16, a stop 76 is attached at the axial end of the line 16. The stop 76 is large enough that it cannot travel past the cleated cams 64, the passageway 70 between them, and the guide 74 above the cams 62 if the line 16 is pulled rightward fully.

On the opposite rightmost side of the line 16, there is a second mounting portion 78 that will work in tandem with the aforementioned first mounting portion 44 during the mounting process. This second mounting portion 78 can be an L-shaped bracket 80 with the line 16 running through an opening 82 on one of the walls of the bracket 80 and having a stop 84 that keeps the bracket 80 from sliding off the end of the line 16. The other wall of the L-shaped bracket 80 has a notch 86 in it which may be used to accommodate reception of a screw or fastener 50 as will be described in greater detail below when describing FIG. 7B.

The second mounting portion 78 is also large enough that it cannot pass through the guide 72 if the line 16 is pulled leftward fully.

As the line 16 is stopped from full leftward or rightward movement in such a way that it could be withdrawn from the housing 14, the housing 14 and the flexible line 16 can form a single inseparable lockout device or assembly. In this way, the parts can be kept together.

Still further, because the line 14 is flexible, the lockout device 10 can be stored quite compactly, lacking long rigid elements that are found in some other locks.

With the structure and general function of the lockout device 10 having been described, some modes of use will now be described with specific reference to FIGS. 5, 6A, 6B, 7A, and 7B.

Figure 6B:
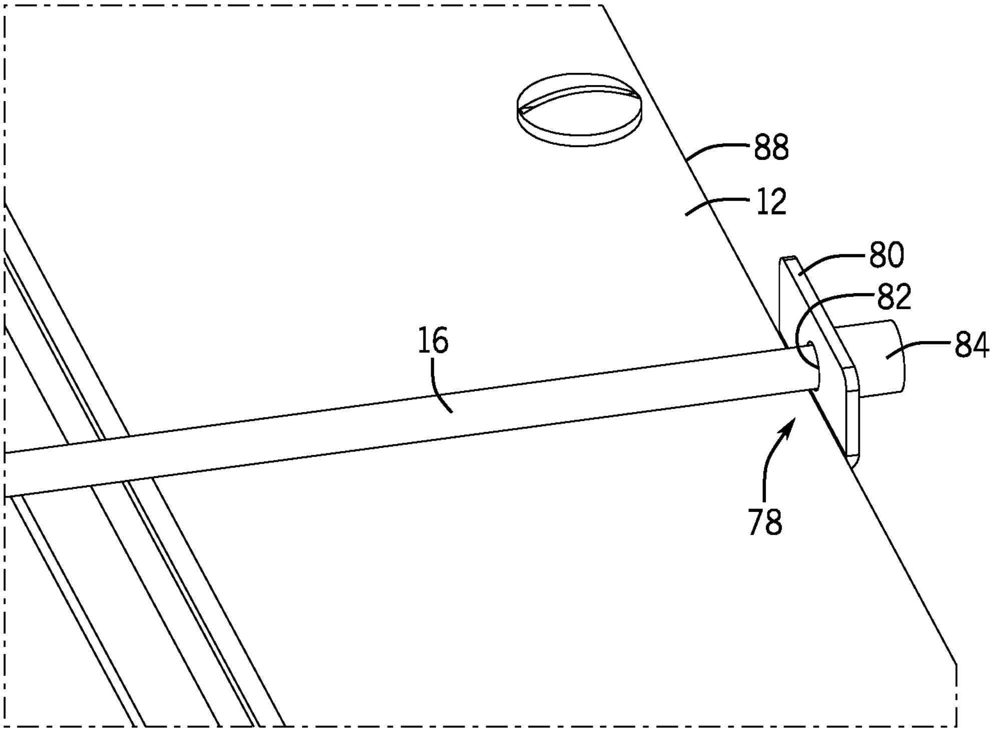

Looking first at FIGS. 5, 6A, and 6B, the lockout device 10 is shown attached to a pair of opposing lateral sides or edges 88 of a breaker box 12 so as to secure a door 90 of the front panel in a closed position (so as to for example, limit access to the circuit breakers found therein). In this specific form of attachment, both the first mounting portion 44 and the second mounting portion 78 are wrapped around the edges 88 as shown in FIGS. 6A and 6B, respectively. This is initially done with the housing 14 in the opened position of FIGS. 1 and 3 such that the flexible line 16 can be drawn taut by pulling the leftmost end of the flexible line 16 leftward. At a point when the line 16 is taut, the line 16 may be temporarily held in place by inserting the line 16 in the passageway 70 between the cleated cams 64. If the line 16 was already between the cams 64, such placement may be unnecessary, and the leftward pulling may effectively just serve to maintain the position as the line 16 is pulled leftward and not permit substantial rightward return of the line. With the line 16 taut, the movable section 20 can be closed into section 18 in clamshell fashion to engage the clamping teeth 62 and the housing openings 66 with the line 16 to further hold the line 16 in place with respect to the housing 14. In so closing the housing 14, not only are the additional line engagement elements engaged, but all of the line engagement elements are contained within or are part of the housing 14, meaning that the line 16 cannot be disengaged from the housing 14 unless the housing 14 is opened back up. In the closed position, one or more padlocks 60 (or other locking elements) can be received in the lock openings 56 as part of a lockout or group lockout procedure to temporarily prevent the re-opening of the housing 14 until the padlock(s) 60 is/are removed. With the line 16 drawn taut, the door 90 of the box 12 cannot be opened and, additionally, the first mounting portion 44 and the second mounting portion 78 cannot be axially separated from one another due to the line engagement elements, so the lockout device 10 cannot be readily removed from the box 12. It is noted that not only does the line 16 potentially block the door 90, but the housing 14 itself may overlap with the door 90 to provide a further mechanical block from the opening of the door 90.

Once the padlock(s) 60 is/are removed, the housing 14 may be opened to automatically disengage the line engagement elements of the clamping teeth 62 and the housing openings 66 and the line 16. Once the housing 14 is opened, the line 16 may also be manually lifted outward or forwardly to withdraw the line 16 from between the cleated cams 64. With that last line engagement element disengaged, slack can be created within the flexible line 16 that permits the first mounting portion 44 and the second mounting portion 78 to be separated apart from one another and removed from the breaker box 12. In this way, the entire lockout device 10 can also be removed from the box 12.

Figure 7B:
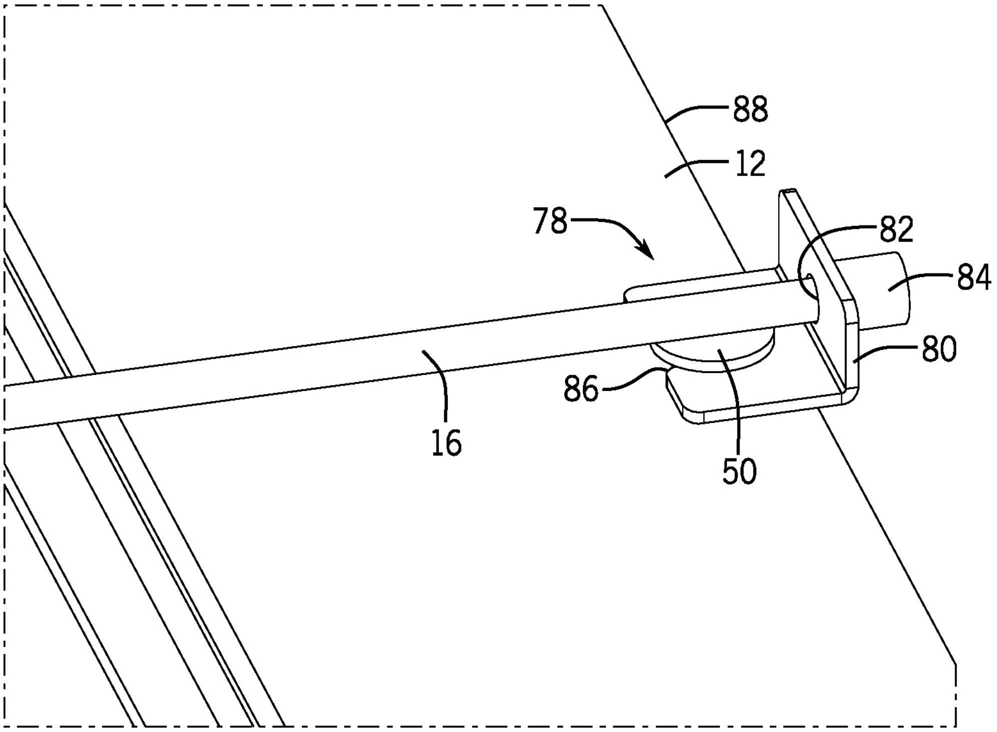

While FIGS. 5, 6A, and 6B illustrate the mounting of the device 10 using brackets 46 and 80 wrapped around the edges 88, other modes of mounting may be used to similar effect. With reference to FIGS. 7A and 7B, for example, it is contemplated that either or both of the previously described edge-bracket mountings from FIGS. 6A and 6B could be replaced with fastener type mountings involving fastener and a keyhole type opening 48 (or other opening) as illustrated in FIG. 7A or involving a fastener 50 and a notch 86 on the bracket 80 as illustrated in FIG. 7B. In such cases, the fastener 50 may be slightly loosened (but not wholly removed) from the box 12 to provide initial clearance between the fastener head and panel face. The opening 48 or notch 86 can then be slid into engagement with the loosened fastener 50, such that the fastener 50 serves as an anchoring point to permit the line 16 is drawn taut during the installation process.

These are but a few additional example mounting types and it will again be appreciated that they are exemplary but not limiting. Types of mountings may be mixed and matched with one another and mounting other than the types illustrated herein could also be employed.

Thus, an improved lockout device for securing a panel door is disclosed. By employing a housing and line type structure, the device may be kept unitary as a single component and accommodate a wide range of panel widths, but still able to be compactly stored and easily transported due to the flexibility of the line. Still further, the device is well adapted for group lockout use and links the closing locking action to the securement of the line in the housing. Beyond this, it can be flexible in mode of mounting, accommodating various types of mounting based on the circumstances of use.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth; and wherein each of the pair of movable sections include clamping teeth as at least one line engagement element.

2. The lockout device of claim 1, wherein, when the first mounting portion and the second mounting portion are secured to opposite sides of the panel, the flexible line can be drawn taut across the door and secured with the at least one line engagement element so as to thereby inhibit removal of the lockout device from the panel and prevent an opening of the door.

3. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth; and wherein one of the pair of movable sections includes a tab with lock openings and the other of the pair of movable section includes a slot through which the tab may pass and wherein, when the pair of movable sections are brought together to the closed position and the tab is received through the slot, a lock is placeable in one of the lock openings to prevent the separation of the pair of movable sections from one another and to restrict access to the at least one line engagement element.

4. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth;

wherein the pair of movable sections are hinged together on one side thereof and are moveable between the open position and the closed position in a clamshell fashion; and wherein each of the pair of movable sections have clamping teeth.

5. The lockout device of claim 4, wherein the clamping teeth are molded as part of the pair of movable sections.

6. The lockout device of claim 1, wherein the at least one line engagement element includes a pair of cleated cams between which the flexible line is receivable.

7. The lockout device of claim 6, further comprising a guide connecting the pair of cleated cams on a top end thereof to provide a restricted space apart from but adjacent to the pair of cleated cams for the disengagement of the flexible line from the pair of cleated cams while retaining the flexible line in the housing.

8. The lockout device of claim 1, wherein the at least one line engagement element further includes a pair of cleated cams between which the flexible line is positionable and wherein the pair of cleated cams accommodate a temporary positioning of the flexible line during installation of the lockout device onto a box.

9. The lockout device of claim 1, wherein the at least one line engagement element further includes housing openings on the housing that close around the flexible line as the housing is closed.

10. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth; and wherein the first mounting portion and the second mounting portion are brackets that are adapted to be wrapped around an edge of the panel.

11. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth; and wherein the first mounting portion and the second mounting portion include openings or notches which are adapted to be secured via a fastener to the panel.

12. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth; and wherein the first mounting portion and the second mounting portion each include a respective bracket that is adapted to be wrapped around an edge of the panel and further include an opening or keyway which is adapted to be secured via a fastener to the panel.

13. A lockout device for a door on a panel, the lockout device comprising:

a housing having a first mounting portion adapted for securement to one side of the panel, the housing comprising a pair of movable sections, at least one of the pair of movable sections supporting at least one line engagement element;

a flexible line having on one end thereof a second mounting portion adapted for securement to another side of the panel from the first mounting portion, the flexible line extending through at least a portion of the housing including the at least one line engagement element for selective engagement therewith;

wherein the pair of movable sections are movable with respect to one another between an open position in which the at least one line engagement element is accessible and a closed position in which the pair of movable sections are lockable together such that the at least one line engagement element is not accessible;

wherein the at least one line engagement element includes clamping teeth between which the flexible line extends and when the pair of movable sections are in the closed position, the clamping teeth engage the flexible line to grip the flexible line at the clamping teeth;

wherein the flexible line has a stop at the end of the flexible line not having the second mounting portion, wherein the housing includes at least one line opening, guide, or loop through which the flexible line extends, and wherein the stop and the second mounting portion are sized to inhibit the passage of the stop and the second mounting portion past the at least one line opening, guide, or loop.

14. The lockout device of claim 1, wherein the housing and the flexible line are not completely separable from one another once assembled together.

* * * * *